(12) United States Patent
Yeh et al.

(10) Patent No.: US 7,584,428 B2
(45) Date of Patent: Sep. 1, 2009

(54) APPARATUS AND METHOD FOR DETECTING HIGHLIGHTS OF MEDIA STREAM

(75) Inventors: Chia-Hung Yeh, Tai-Nan (TW);
Rung-Wen Liou, Kao-Hsiung (TW);
Chih-Hung Kuo, Kao-Hsiung (TW);
Hsuan-Huei Shih, Taipei (TW)

(73) Assignee: MAVs Lab. Inc., Taipei (TW)

( * ) Notice: Subject to any disclaimer, the term of this patent is extended or adjusted under 35 U.S.C. 154(b) by 379 days.

(21) Appl. No.: 11/307,496

(22) Filed: Feb. 9, 2006

(65) Prior Publication Data

US 2007/0186163 A1 Aug. 9, 2007

(51) Int. Cl.
*G06F 3/00* (2006.01)
(52) U.S. Cl. ..................................... 715/723
(58) Field of Classification Search .................. 715/723
See application file for complete search history.

(56) References Cited

U.S. PATENT DOCUMENTS

| | | | | |
|---|---|---|---|---|
| 2004/0136460 A1* | 7/2004 | Zhang et al. | ........... | 375/240.16 |
| 2004/0223052 A1* | 11/2004 | Sugano et al. | ................ | 348/70 |
| 2005/0060152 A1* | 3/2005 | Jiang et al. | .................. | 704/240 |
| 2006/0059120 A1* | 3/2006 | Xiong et al. | .................... | 707/3 |
| 2007/0041706 A1* | 2/2007 | Gunatilake | .................... | 386/95 |
| 2007/0292112 A1* | 12/2007 | Lee et al. | ....................... | 386/95 |

OTHER PUBLICATIONS

Cai et al., "Highlight Sound Effects Detection in Audio Stream," Jul. 2003, Tsinghua University.*

* cited by examiner

*Primary Examiner*—William L Bashore
*Assistant Examiner*—Daniel Um
(74) *Attorney, Agent, or Firm*—Winston Hsu

(57) ABSTRACT

An apparatus for detecting highlights of a media stream, the apparatus including: a video processing module, an audio processing module, a shot change detector, and a post processor. The video processing module determines a video threshold value; the audio processing module determines at least one audio threshold value; the shot change detector is electrically connected to the video processing module and the audio processing module for deciding a shot change to inform the video processing module and the audio processing module; and the post processor is electrically connected to the video processing module and the audio processing module for determining video highlights according to video parameters and the video threshold value, and audio highlights according to audio parameters and the audio threshold value, and then deciding the highlights of the media stream according to the video highlights and the audio highlights.

48 Claims, 6 Drawing Sheets

APPARATUS AND METHOD FOR DETECTING HIGHLIGHTS OF MEDIA STREAM

BACKGROUND OF THE INVENTION

1. Field of the Invention

The present invention relates to an apparatus and method for detecting highlights of a media stream, and more specifically, to an apparatus utilizing video features to decide video highlights, utilizing audio features to decide audio highlights, and then deciding highlights according to both video and audio highlights.

2. Description of the Prior Art

The prior art on automatic extraction of highlights of special programs relies on video features or audio features. For example, sports highlights are obtained through color detecting of the scene. A general movie, however, needs a method that considers both audio and video features to obtain movie highlights accurately.

For obtaining highlights through detecting video features, prior arts utilize dividing a frame into several color blocks and comparing these color blocks with a reference frame to identify scenes. As the highlights usually appear at specific scenes, the candidate frames for obtaining the highlights are reduced. For obtaining highlights through detecting audio features, since a peak level of audio data is evaluated, if a plurality of peaks exists in a certain short time interval, an overlapped interval may be extracted as the highlights, and therefore the aim accuracy of the highlight detection is not good.

Furthermore, a structure of considering both audio and video features together to detect movie highlights is not yet available. An apparatus for automatically detecting highlights of general movies through audio and video features together will significantly improve the quality of audio-visual programs.

SUMMARY OF THE INVENTION

According to the claimed invention, an apparatus for detecting highlights of a media stream is disclosed. The apparatus includes a video processing module, an audio processing module, a shot change detector, and a post processor. The video processing module determines a video threshold value; the audio processing module determines at least one audio threshold value; the shot change detector is electrically connected to the video processing module and the audio processing module, for deciding a shot change to inform the video processing module and the audio processing module; and the post processor is electrically connected to the video processing module and the audio processing module, for determining video highlights according to video parameters and the video threshold value, and for determining audio highlights according to audio parameters and the audio threshold value, and then deciding the highlights of the media stream according to the video highlights and the audio highlights.

According to the claimed invention, a method for detecting highlights of a media stream is further disclosed. The method includes: determining a video threshold value; determining at least one audio threshold value; deciding a shot change to divide the media stream into several shots; and determining video highlights according to video parameters and the video threshold value, and determining audio highlights according to audio parameters and the audio threshold value, and then deciding the highlights of the media stream according to the video highlights and the audio highlights.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
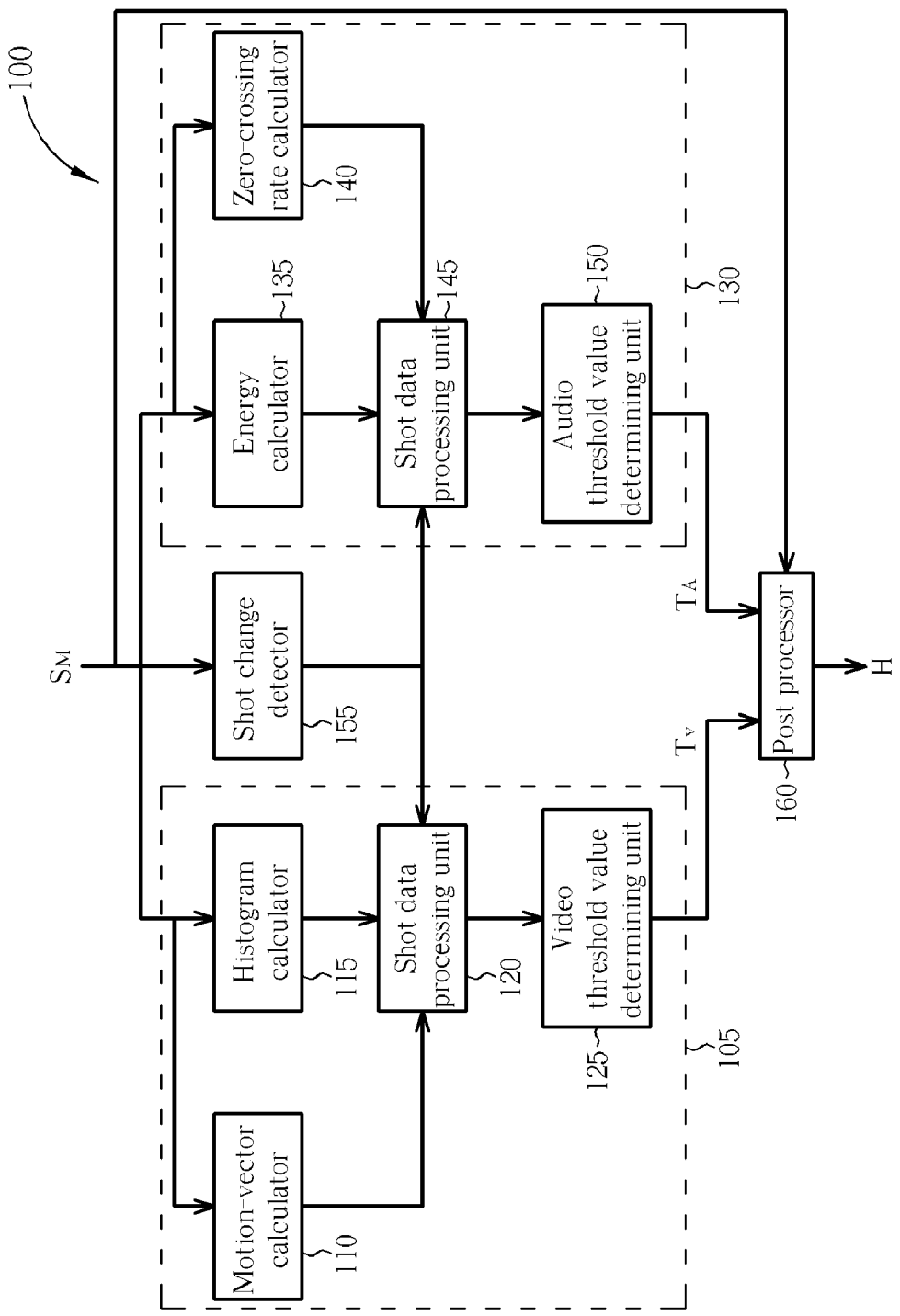
FIG. 1 is a diagram of an apparatus for detecting highlights according to a first embodiment of the present invention.

Please refer to FIG. 1. FIG. 1 is a diagram of an apparatus 100 for detecting highlights according to a first embodiment of the present invention. The apparatus includes a motion-vector calculator 110, a histogram calculator 115, shot data processing units 120 and 145, a video threshold value determining unit 125, an energy calculator 135, a zero-crossing rate calculator 140, an audio threshold value determining unit 150, a shot change detector 155, and a post processor 160. Because the motion-vector calculator 110, the histogram calculator 115, the shot data processing unit 120, and the video threshold value determining unit 125 are combined to process a media stream $S_M$ to generate a video threshold $T_V$ for determining video highlights, these function blocks are incorporated to form a video processing module 105. Similarly, as the energy calculator 135, the zero-crossing rate calculator 140, the shot data processing unit 145, and the audio threshold value determining unit 150 are combined to process a media stream $S_M$ to generate an audio threshold $T_A$ for determining audio highlights, these function blocks are incorporated to form an audio processing module 130.

As shown in FIG. 1, the media stream $S_M$ is respectively transmitted into the shot change detector 155, the video processing module 105, the audio processing module 130 and the post processor 160. The video processing module 105 determines the video threshold value $T_V$ according to the media stream $S_M$ and transmits the video threshold value $T_V$ into the post detector 160. At the same time, the audio processing module 130 determines the audio threshold value $T_A$ according to the media stream $S_M$ and transmits the audio threshold value $T_A$ into the post detector 160. The post processor 160 determines the video highlights according to video parameters of the media stream $S_M$ and the video threshold value $T_V$, and the audio highlights according to audio parameters of the media stream $S_M$ and the audio threshold value $T_A$, and then decides the highlights H of the media stream according to the video highlights and the audio highlights. In the video processing module 105, the histogram calculator 115 receives the media stream $S_M$ and calculates a histogram difference between two neighboring frames, and the motion-vector calculator 110 calculates a sum of motion vectors in a frame. The shot change detector 155 divides the media stream $S_M$ into a plurality of shots, and informs the shot data processing units 120 and 145. A shot containing too few frames means that the shot is short, therefore the shot data processing unit 120 independently processes the shot having a frame number less than a frame reference value, for example, the shot data processing unit 120 calculates a zero-crossing rate of these shots and compares the zero-crossing rate with a zero-crossing rate average of all media stream $S_M$ to determine the highlights. The shot data processing unit 120 further averages the histogram differences in the remaining shot to generate a histogram average and averages the sums of motion vectors corresponding to the frames in the remaining shot to generate a motion-vector average. The histogram average and the motion-vector average are transmitted into the video threshold value determining unit 125. The video threshold value determining unit 125 averages the histogram averages of all the remaining shots again to obtain a histogram reference value, and compares the histogram average of each remaining shot with the histogram reference value, where the shot having a histogram average greater than the histogram reference value is not applied to determine the video threshold value.

Finally, the video threshold value determining unit 125 only averages the motion-vector averages corresponding to the shots whose histogram average is not greater than the histogram reference value to generate a final motion-vector average, and multiplies the final motion-vector average by a weighting factor, for example, 0.8, to determine the video threshold value. Please note that considering the histogram difference and the motion vectors of the media stream $S_M$ together increases the accuracy of the highlights detection, but only considering the motion vectors is also allowable and less cost.

In the audio processing module 130, the energy calculator 135 receives the media stream $S_M$ and detects volume energy in a frame of the media stream $S_M$, and the zero-crossing rate calculator 140 detects a zero-crossing rate in a frame. Both the volume energy and the zero-crossing rate are transmitted into the shot data processing unit 145. The shot change detector 155 informs the shot data processing unit 145 of the shot length, so the shot data processing unit 145 abandons the shot having a frame number less than a frame reference value, averages the volume energy of the remaining shots to generate an energy average and averages the zero-crossing rate of the remaining shots to generate a rate average.

The audio threshold value determining unit 150 works in a different way from the video threshold determining unit. The audio threshold value determining unit 150 determines a first audio threshold value by averaging all energy averages of the media stream and determines a second audio threshold value by averaging all rate averages of the media stream. That is, there are two different audio threshold values for deciding audio highlights according to different requirements. The post processor 160 receives the video threshold value $T_V$ and compares the video threshold value $T_V$ with a sum of motion vectors associated with a current frame of the media stream $S_M$. If the sum is greater than the video threshold value, the post processor 160 selects the current frame as a video highlight; and if the sum is not greater than the video threshold value, the post processor 160 does not select the current frame as the video highlight. Similarly, the post processor 160 receives the audio threshold value $T_A$ and compares the audio threshold value $T_A$ with volume energy or the zero-crossing rate associated with a current frame of the media stream $S_M$. Taking the volume energy for example, if the volume energy is greater than the audio threshold value, the post processor 160 selects the current frame as an audio highlight; and if the volume energy is not greater than the audio threshold value, the post processor 160 does not select the current frame as the audio highlight. The post processor 160 finally decides highlights H from the video highlight and the audio highlight.

Please note that, the post processor 160 decides highlights in a time domain, therefore, the post processor 160 is able to decide video highlight shots according to the video and audio threshold values and gather several shots front or behind of the highlight shots to construct a complete highlight. Therefore users can see a more smooth highlight without too many breaks.

Figure 2:
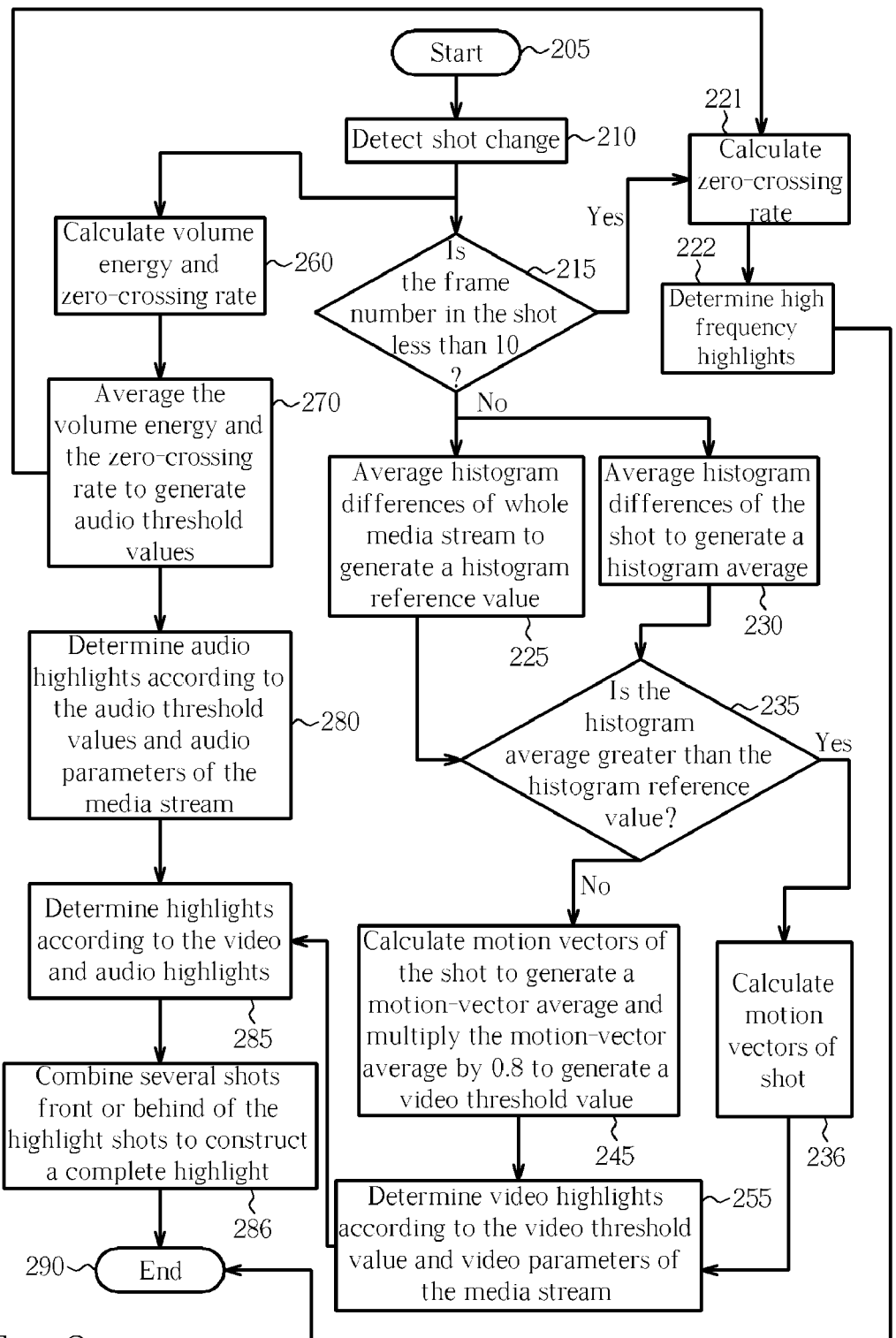
FIG. 2 is a flowchart of a method for detecting highlights corresponding to the first embodiment shown in FIG. 1.

Please refer to FIG. 2. FIG. 2 is a flowchart of the method for detecting highlights corresponding to the first embodiment shown in FIG. 1. The steps of the method are described below:

step 205 start;

step 210 detect shot change to divide the media stream into a plurality of shots and then go to step 215 and step 260;

step 215 Is the frame number in the shot less than 10? If YES, go to step 221; if NO, go to step 225 and step 230 sequentially;

step 221 calculate zero-crossing rate of the shot;

step 222 determine high frequency highlights, jump to step 290;

step 225 average histogram difference of whole media stream to obtain a histogram reference value then go to step 235;

step 230 average histogram difference of the shot to generate a histogram average;

step 235 Is the histogram average greater than the histogram reference value? If YES, go to step 236; if NO, go to step 245;

step 236 calculate motion vectors of the shot, go to step 255;

step 245 calculate motion vectors of the shot to generate a motion-vector average and multiply the motion-vector average by 0.8 to obtain a video threshold value;

step 255 determine video highlights according to the video threshold value and a sum of motion vectors associated with a current frame of the media stream; go to step 285;

step 260 calculate volume energy and zero-crossing rate of the frame;

step 270 average the volume energy and the zero-crossing rate to generate audio threshold values, go to step 222 and step 280;

step 280 determine audio highlights according to the audio threshold values and audio parameters (such as the volume energy and the zero-crossing rate) of a current frame of the media stream;

step 285 determine highlights according to the video and audio highlights;

step 286 combine several shots front or behind of the highlight shots to construct a complete highlight;

step 290 end.

Figure 3:
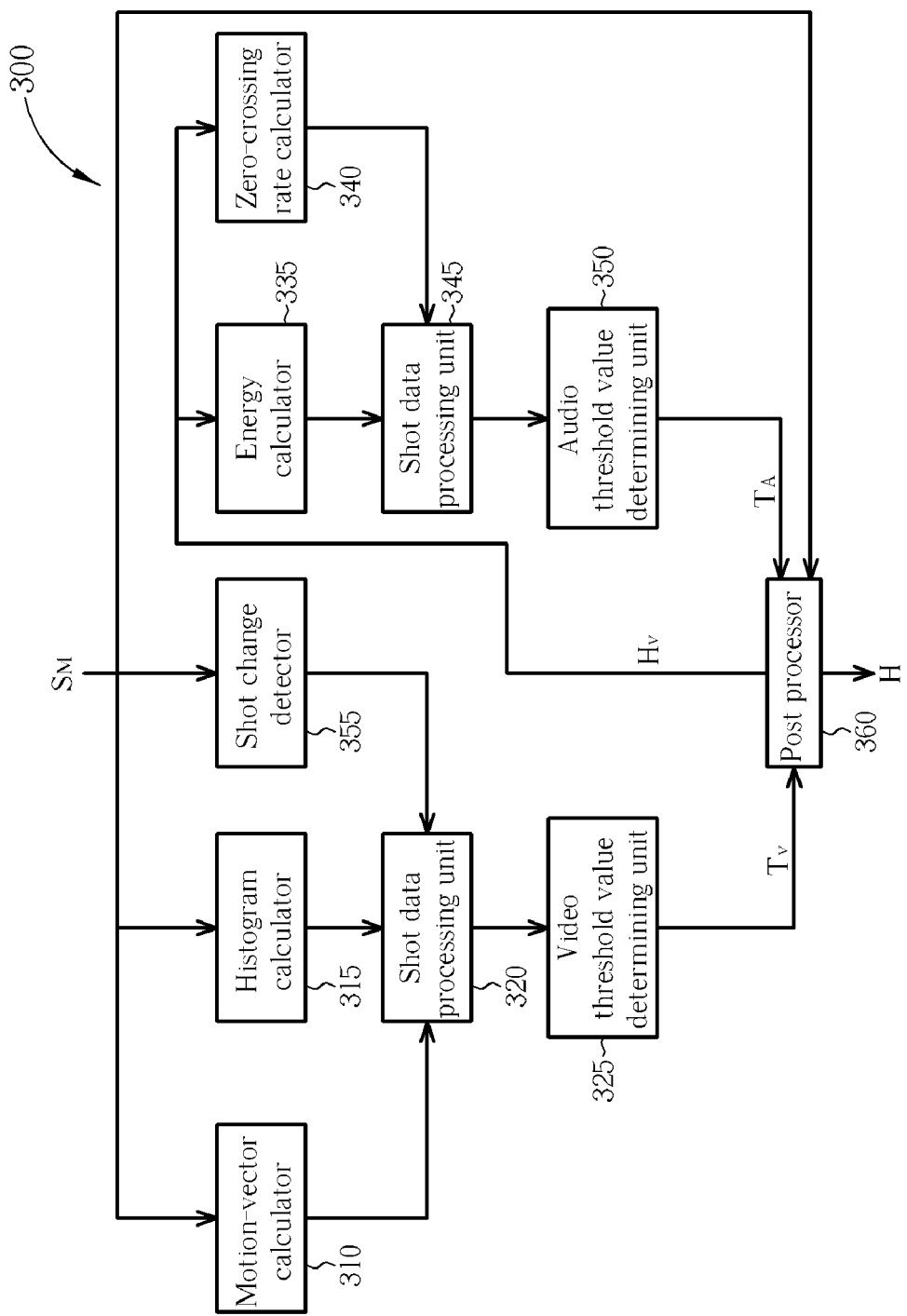
FIG. 3 is a diagram of an apparatus for detecting highlights according to a second embodiment of the present invention.

Please refer to FIG. 3. FIG. 3 is a diagram of the apparatus 300 for detecting highlights according to a second embodiment of the present invention. The apparatus 300 includes a motion-vector calculator 310, a histogram calculator 315, shot data processing units 320 and 345, a video threshold value determining unit 325, an energy calculator 335, a zero-crossing rate calculator 340, an audio threshold value determining unit 350, a shot change detector 355, and a post processor 360. Comparing this embodiment with the second embodiment shown in FIG. 1, it can be seen that the function blocks in these two figures are the same, but the connection is different. In the second embodiment, the apparatus 300 first processes the video part of the media stream $S_M$, and generates a video threshold value $T_V$ delivered into the post processor 360. The post processor 360 decides the video highlights $H_V$ according to a sum of motion vectors of each frame of the media stream $S_M$ and the video threshold value $T_V$.

Next, the apparatus 300 processes shots of the video highlights $H_V$ by the audio highlight detection method described in the first embodiment to obtain an audio threshold value $T_A$. Finally, the post processor 360 decides audio highlights from the video highlight shots as final highlights H according to audio parameters such as volume energy, a zero-crossing rate and the audio threshold values $T_A$. Because the apparatus 300 deals with the video part first, the data for processing in the audio part is greatly reduced; therefore the processing speed is faster. Moreover, in some specific movies such as the action movie, due to the video feature is more distinct than the audio feature, the highlight gathered through the video feature in the beginning and further selected by the audio feature is more correct and better.

Figure 4:
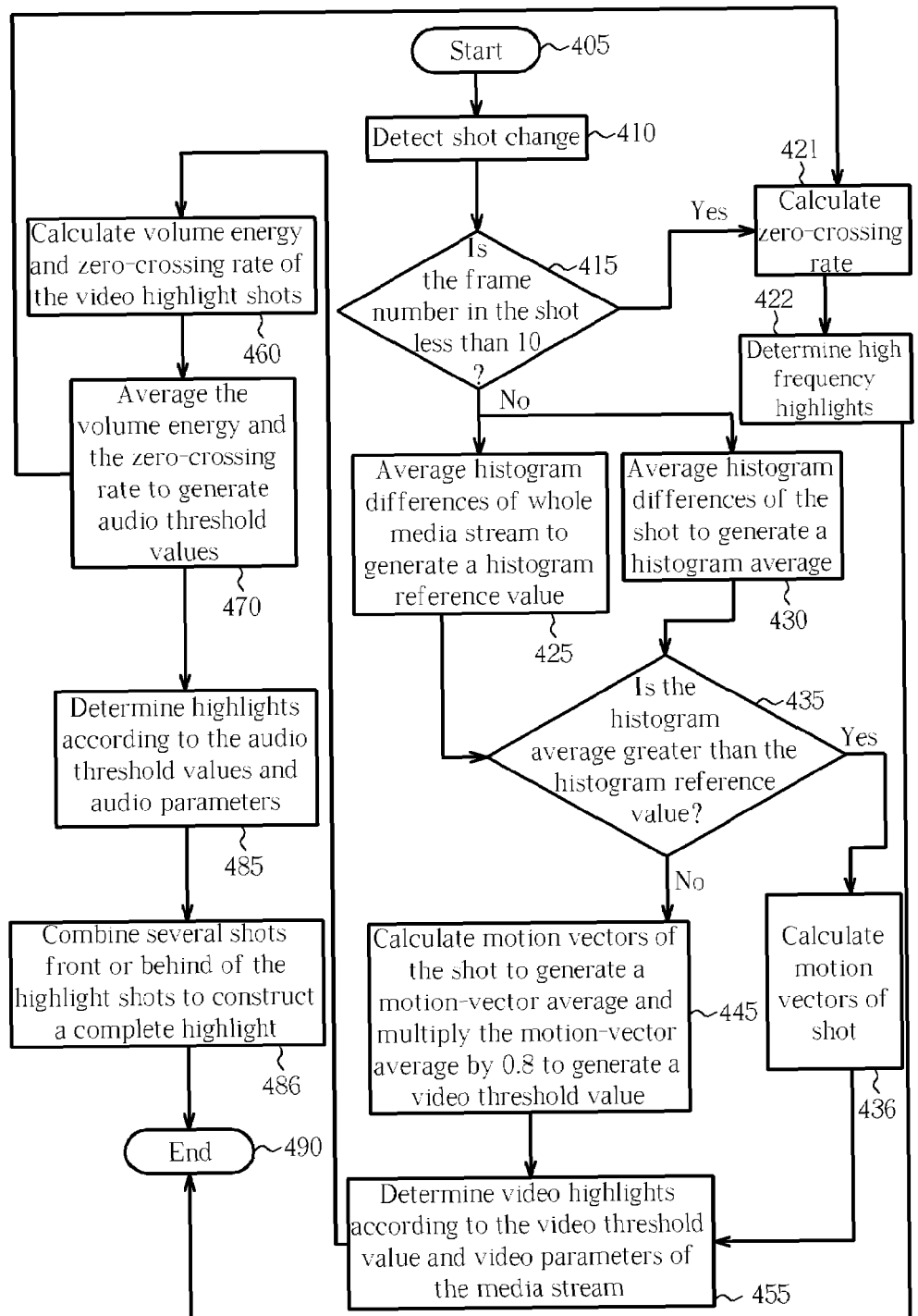
FIG. 4 is a flowchart of a method for detecting highlights corresponding to the second embodiment shown in FIG. 3.

Please refer to FIG. 4. FIG. 4 is a flowchart of the method for detecting highlights corresponding to the second embodiment shown in FIG. 3. It differs from the flowchart shown in FIG. 2 by processing the video part first and then processing the audio part to determine final highlights. In FIG. 2, the video and audio part are considered at the same time to determine final highlights. The steps of the method shown in FIG. 4 are described below:

step 405 start;

step 410 detect shot change to divide the media stream into a plurality of shots;

step 415 Is the frame number in the shot less than 10? If YES, go to step 421; if NO, go to step 425 and step 430 sequentially;

step 421 calculate zero-crossing rate of the shot;

step 422 determine high frequency highlights, jump to step 490;

step 425 average histogram difference of whole media stream to obtain a histogram reference value then go to step 435;

step 430 average histogram difference of the shot to generate a histogram average;

step 435 Is the histogram average greater than the histogram reference value? If YES, go to step 436; if NO, go to step 445;

step 436 calculate motion vectors of the shot, go to step 455;

step 445 calculate motion vectors of the shot to generate a motion-vector average and multiply the motion-vector average by 0.8 to obtain a video threshold value;

step 455 determine video highlights according to the video threshold value and a sum of motion vectors associated with a current frame of the media stream;

step 460 calculate volume energy and zero-crossing rate of the video highlight shots;

step 470 average the volume energy and the zero-crossing rate to generate audio threshold values, go to step 422 and step 485;

step 485 determine highlights from the video highlight shots according to the audio threshold values and audio parameters;

step 486 combine several shots front or behind of the highlight shots to construct a complete highlight;

step 490 end.

Figure 5:
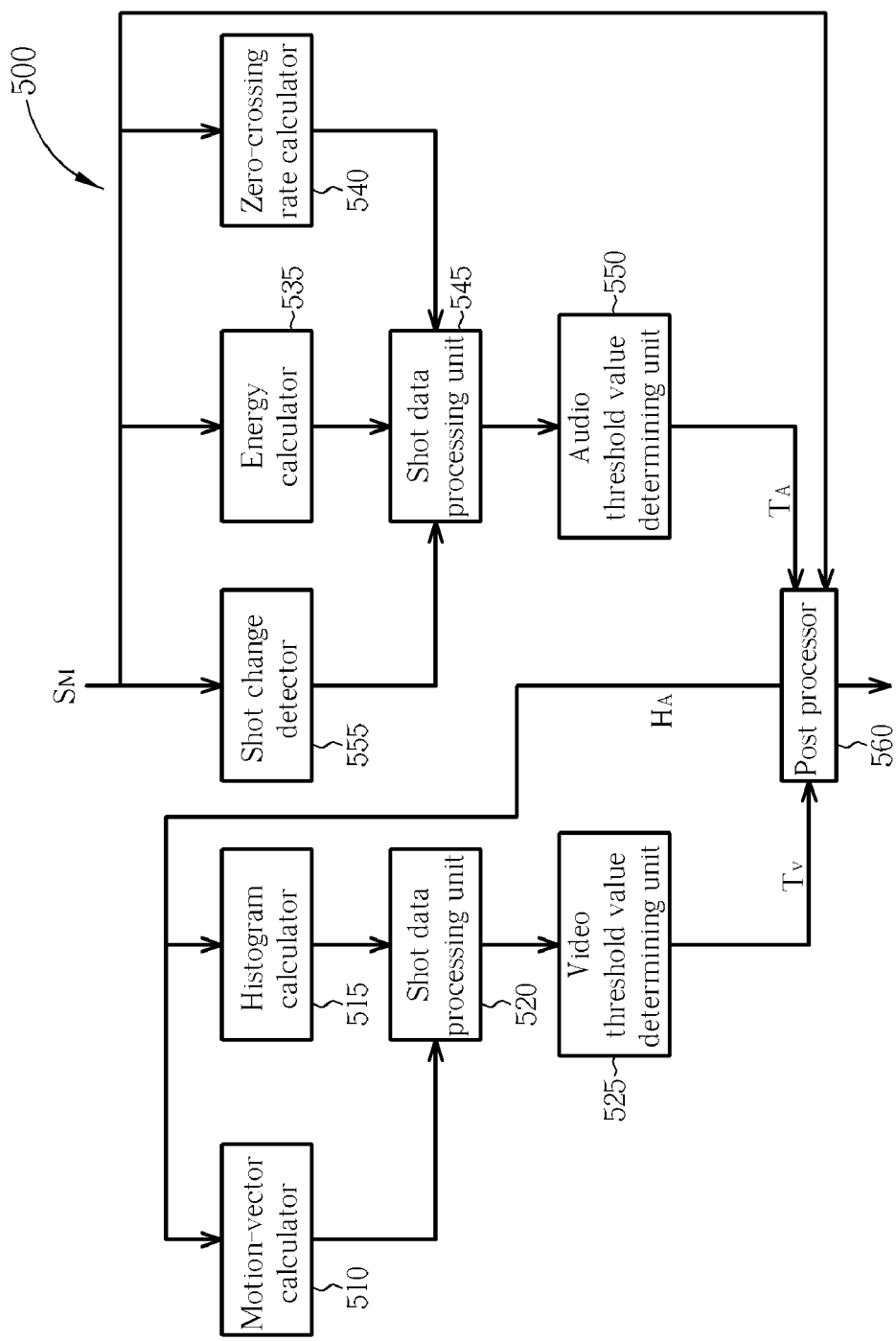
FIG. 5 is a diagram of an apparatus for detecting highlights according to a third embodiment in the present invention.

Additionally, it is not always necessary to process the video part first, that is, the audio part can also be processed first. Please refer to FIG. 5. FIG. 5 is a diagram of the apparatus 500 for detecting highlights according to a third embodiment in the present invention. The apparatus 500 includes a motion-vector calculator 510, a histogram calculator 515, shot data processing units 520 and 545, a video threshold value determining unit 525, an energy calculator 535, a zero-crossing rate calculator 540, an audio threshold value determining unit 550, a shot change detector 555, and a post processor 560. Again, the function blocks are the same as the first and second embodiments, but the connection is different. In the third embodiment, the apparatus 500 first processes the audio part of the media stream $S_M$, and then generates an audio threshold value $T_A$ delivered into the post processor 560. The post processor 560 decides the audio highlights $H_A$ according to audio parameters of the media stream $S_M$ (such as the volume energy and the zero-crossing rate) and the audio threshold value $T_A$. Next, the apparatus 500 processes shots of the audio highlights $H_A$ by the video highlight detection method described in the first embodiment to obtain a video threshold value $T_V$. Finally, the post processor 560 decides video highlights from the audio highlight shots as final highlights H according to sums of motion vectors of the audio highlight shots and the video threshold values $T_V$. Because the apparatus 500 deals with the audio part first, the data for processing in the video part is greatly reduced; therefore the processing speed is also faster as described in the second embodiment. Moreover, in some specific movies such as the feature movie, due to the audio feature is more distinct than the video feature, the highlight gathered through the audio feature in the beginning and further selected by the video feature is more correct and better.

Figure 6:
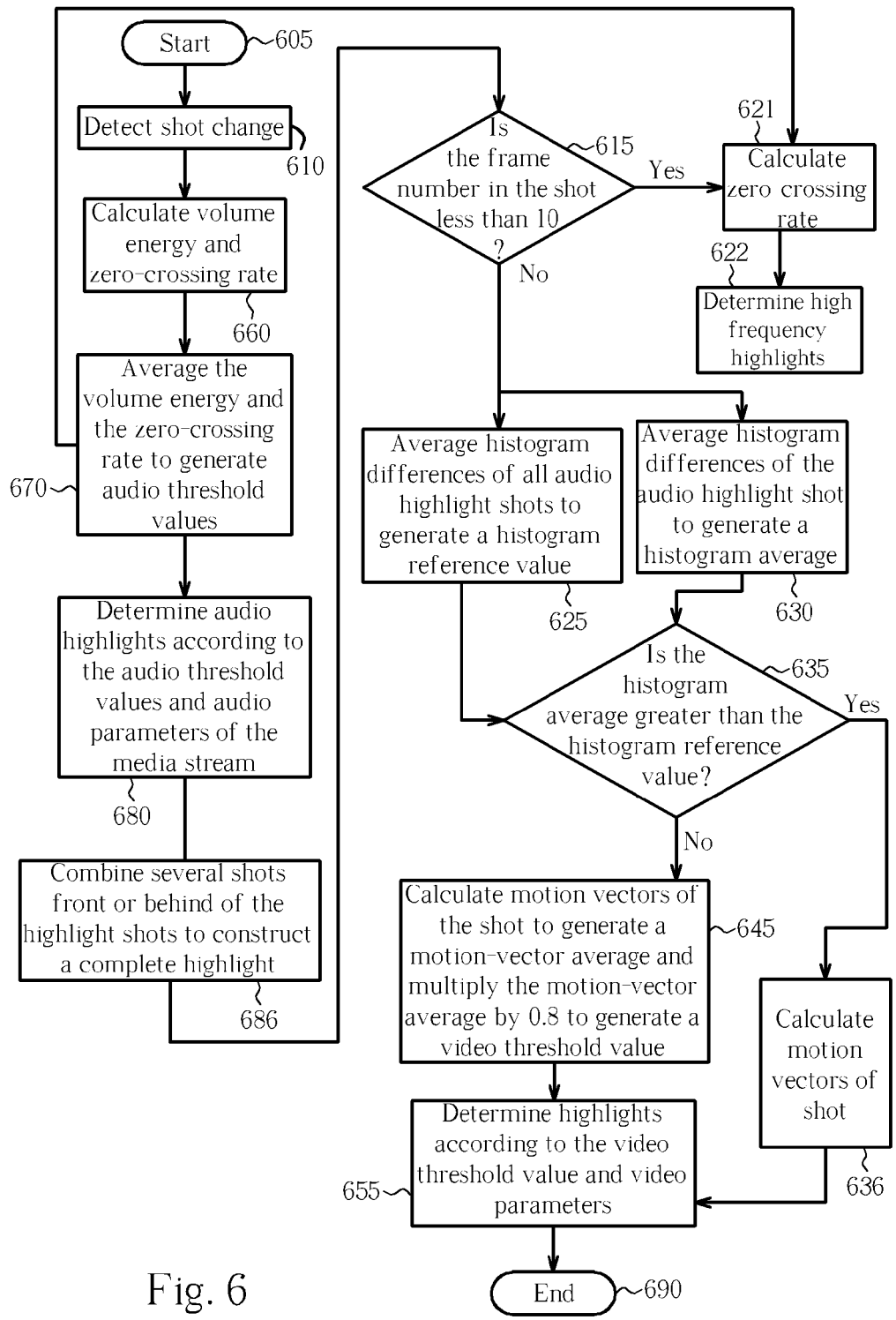
FIG. 6 is a flowchart of a method for detecting highlights corresponding to the third embodiment shown in FIG. 5.

Please refer to FIG. 6. FIG. 6 is a flowchart of the method for detecting highlights corresponding to the third embodiment shown in FIG. 5. The procedure sequence of FIG. 6 processes the audio part first and then processes the video part to determine final highlights. The steps of the method shown in FIG. 6 are described below:

step 605 start;

step 610 detect shot change to divide the media stream into a plurality of shots and then go to step 660;

step 615 Is the frame number in the shot less than 10? If YES, go to step 621; if NO, go to step 625 and step 630 sequentially;

step 621 calculate zero-crossing rate of the shot;

step 622 determine high frequency highlights, jump to step 690;

step 625 average histogram differences of all audio highlight shots to obtain a histogram reference value; go to step 635;

step 630 average histogram differences of the audio highlight shots to generate a histogram average;

step 635 Is the histogram average greater than the histogram reference value? If YES, go to step 636; if NO, go to step 645;

step 636 calculate motion vectors of the shot, go to step 655;

step 645 calculate motion vectors of the shot to generate a motion-vector average and multiply the motion-vector average by 0.8 to obtain a video threshold value;

step 655 determine final highlights according to the video threshold value and a sum of motion vectors associated with the audio highlight shots; go to step 690;

step 660 calculate volume energy and zero-crossing rate of the frame;

step 670 average the volume energy and the zero-crossing rate to generate audio threshold values, go to step 622 and step 680;

step 680 determine audio highlights according to the audio threshold values and audio parameters (such as the volume energy and the zero-crossing rate) of a current frame of the media stream; go to step 615;

step 686 combine several shots front or behind of the highlight shots to construct a complete highlight;

step 690 end.

The present invention provides an apparatus and a method for detecting highlights according to video and audio parameters. The processing procedures are allowed to be set according to practical conditions. For example, the action movie is better for processing video part first and then processing audio part next; and the feature movie is better for processing audio part first and then processing video part next. Please note that, even though no processing sequence is set, the present invention is still practicable.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An apparatus for detecting highlights of a media stream, the apparatus comprising:
    a video processing module for determining a video threshold value by referring to motion vectors in the media stream;
    an audio processing module for determining at least one audio threshold value by referring to volume energy in the media stream;
    a shot change detector, electrically connected to the video processing module and the audio processing module, for deciding a shot change to inform the video processing module and the audio processing module; and
    a post processor, electrically connected to the video processing module and the audio processing module, for determining the video highlights according to video parameters and the video threshold value, and the audio highlights according to audio parameters and the audio threshold value, and then deciding the highlights of the media stream according to the video highlights and the audio highlights; wherein each of the video parameters is a sum of motion vectors, and the post processor compares the sum associated with a current frame with the video threshold value; if the sum is greater than the video threshold value, the post processor decides the current frame as a video highlight; and if the sum is not greater than the video threshold value, the post processor does not decide the current frame as the video highlight;
    wherein when a video parameter corresponding to a first frame is greater than the video threshold value, the post processor decides the first frame as a video highlight; and when an audio parameter corresponding to a second frame is greater than the audio threshold value, the post processor decides the second frame as an audio highlight.

2. The apparatus of claim 1, wherein the video processing module comprises:
    a motion-vector calculator for calculating a sum of motion vectors in a frame of the media stream;
    a shot data processing unit, electrically connected to the shot change detector and the motion-vector calculator, for determining a first computation result according to a plurality of sums of motion vectors corresponding to a plurality of frames in a shot; and
    a video threshold value determining unit, electrically connected to the shot data processing unit, for determining the video threshold value according to the first computation result.

3. The apparatus of claim 2, wherein the shot data processing unit averages the sums of motion vectors corresponding to the frames in the shot to generate a motion-vector average as the first computation result.

4. The apparatus of claim 3, wherein the video threshold value determining unit multiplies the motion-vector average by a weighting factor to determine the video threshold value.

5. The apparatus of claim 2, wherein the shot data processing unit compares an audio zero-crossing rate of the shot having a frame number less than a frame reference value with an audio zero-crossing rate average to obtain the highlights.

6. The apparatus of claim 2, wherein the video processing module further comprises:
    a histogram calculator for calculating a histogram difference between two neighboring frames;
    wherein the shot data processing unit further calculates a second computation result according to histogram differences in the shot; and
    the video threshold value determining unit further computes a histogram reference value according to a plurality of histogram differences of the media stream, and determines the video threshold value only according to the first computation result in the shot when the second computation result is less than the histogram reference value.

7. The apparatus of claim 6, wherein the shot data processing unit averages the histogram differences in the shot to generate a histogram average as the second computation result, and the video threshold value determining unit averages a plurality of histogram differences of the media stream to obtain the histogram reference value.

8. The apparatus of claim 1, wherein the audio processing module comprises:
    an energy calculator for detecting volume energy in a frame of the media stream;
    a shot data processing unit, electrically connected to the shot change detector and the energy calculator, for determining a computation result according to volume energy of frames in a shot; and
    an audio threshold value determining unit, electrically connected to the shot data processing unit, for determining the audio threshold value according to the computation result.

9. The apparatus of claim 8, wherein the shot data processing unit averages the volume energy of the frames in the shot to generate an energy average as the computation result.

10. The apparatus of claim 9, wherein the audio threshold value determining unit determines the audio threshold value by averaging a plurality of energy averages of the media stream.

11. The apparatus of claim 1, wherein the audio processing module comprises:
    a zero-crossing rate calculator for detecting an audio zero-crossing rate in a frame;
    a shot data processing unit, electrically connected to the shot change detector and the zero-crossing rate calculator, for determining a first computation result according to calculating audio zero-crossing rates of frames in a shot; and
    an audio threshold value determining unit, electrically connected to the shot data processing unit, for determining the audio threshold value according to the first computation result.

12. The apparatus of claim 11, wherein the shot data processing unit averages the audio zero-crossing rates of the frames in the shot to generate a rate average as the first computation result.

13. The apparatus of claim 12, wherein the audio threshold value determining unit determines the audio threshold value by averaging a plurality of audio zero-crossing rates of the media stream.

14. The apparatus of claim 11, further comprising:
an energy calculator for detecting volume energy in a frame;
wherein the shot data processing unit further calculates a second computation result according to volume energy of the frames in the shot; and the audio threshold value determining unit determines the audio threshold value according to both the first and second computation results.

15. The apparatus of claim 1, wherein an audio parameter is volume energy, and the post processor compares volume energy of a current frame with the audio threshold value; if the volume energy is greater than the audio threshold value, the post processor decides the current frame as an audio highlight; and if the volume energy is not greater than the audio threshold value, the post processor does not decide the current frame as the audio highlight.

16. The apparatus of claim 1, wherein an audio parameter is an audio zero-crossing rate, and the post processor compares an audio zero-crossing rate of a current frame with the audio threshold value; if the audio zero-crossing rate is greater than the audio threshold value, the post processor decides the current frame as an audio highlight; and if the audio zero-crossing rate is not greater than the audio threshold value, the post processor does not decide the current frame as the audio highlight.

17. The apparatus of claim 1, wherein the post processor first decides the video highlights, and then determines the audio highlights and processes the video highlights according to the audio highlights to determine the highlights of the media stream.

18. The apparatus of claim 1, wherein the post processor first decides the audio highlights, and then decides the video highlights and processes the audio highlights according to the video highlights to determine the highlights of the media stream.

19. The apparatus of claim 1, wherein the post processor decides the video and audio highlights at the same time to determine the highlights of the media stream.

20. The apparatus of claim 1, wherein the audio and video parameters are set separately for different preset circumstances.

21. The apparatus of claim 1, wherein the post processor gathers a plurality of shots front or behind of the highlights to construct a complete highlight scene.

22. A method for detecting highlights of a media stream, the method comprising:
determining a video threshold value by referring to motion vectors in the media stream;
determining at least one audio threshold value by referring to volume energy in the media stream;
deciding a shot change to divide the media stream into several shots; and
determining video highlights according to video parameters and the video threshold value, and determining audio highlights according to audio parameters and the audio threshold value, and then deciding the highlights of the media stream according to the video highlights and the audio highlights, wherein each of the video parameters is a sum of motion vectors;
deciding a first frame as a video highlight when a video parameter corresponding to the first frame is greater than the video threshold value;
deciding a second frame as an audio highlight when an audio parameter corresponding to the second frame is greater than the audio threshold value; and
comparing the sum associated with a current frame with the video threshold value; if the sum is greater than the video threshold value, the current frame is selected as a video highlight; and if the sum is not greater than the video threshold value, the current frame is not selected as the video highlight.

23. The method of claim 22, wherein the step of determining a video threshold value comprises:
calculating a sum of motion vectors in a frame of the media stream;
determining a first computation result according to a plurality of sums of motion vectors corresponding to a plurality of frames in a shot; and
determining the video threshold value according to the first computation result.

24. The method of claim 23, wherein the first computation result is a motion-vector average determined by averaging the sums of motion vectors corresponding to the frames in the shot.

25. The method of claim 24, wherein the video threshold value is determined through multiplying the motion-vector average by a weighting factor.

26. The method of claim 23, further comprising:
comparing an audio zero-crossing rate of the shot having a frame number less than a frame reference value with an audio zero-crossing rate average to obtain the highlights.

27. The method of claim 23, further comprising:
calculating a histogram difference between two neighboring frames;
determining a second computation result according to histogram differences in the shot; and
computing a histogram reference value according to a plurality of histogram differences of the media stream, and determining the video threshold value only according to the first computation result in the shot when the second computation result is less than the histogram reference value.

28. The method of claim 27, wherein the second computation result is a histogram average determined by averaging the histogram differences in the shot, and the histogram reference value is determined by averaging a plurality of histogram differences of the media stream.

29. The method of claim 22, wherein the step of determining at least one audio threshold value comprises:
detecting volume energy in a frame of the media stream;
determining a computation result according to volume energy of frames in a shot; and
determining the audio threshold value according to the computation result.

30. The method of claim 29, wherein the computation result is an energy average determined by averaging the volume energy of the frames in the shot.

31. The method of claim 30, wherein the audio threshold value is determined by averaging a plurality of energy averages of the media stream.

32. The method of claim 22, wherein the step of determining at least one audio threshold value comprises:
detecting an audio zero-crossing rate in a frame;
determining a first computation result according to calculating audio zero-crossing rates of frames in a shot; and
determining the audio threshold value according to the first computation result.

33. The method of claim 32, wherein the first computation result is determined by averaging the audio zero-crossing rates of the frames in the shot.

34. The method of claim 33, wherein the audio threshold value is determined by averaging a plurality of audio zero-crossing rates of the media stream.

35. The method of claim 32, further comprising:
detecting volume energy in a frame;
calculating a second computation result according to volume energy of the frames in the shot; and
determining the audio threshold value according to both the first and second computation results.

36. The method of claim 22, wherein an audio parameter is volume energy, and the method further comprises:
comparing volume energy of a current frame with the audio threshold value; if the volume energy is greater than the audio threshold value, the current frame is selected as an audio highlight; and if the volume energy is not greater than the audio threshold value, the current frame is not selected as the audio highlight.

37. The method of claim 22, wherein an audio parameter is an audio zero-crossing rate, and the method further comprises:
comparing the audio zero-crossing rate of a current frame with the audio threshold value; if the audio zero-crossing rate is greater than the audio threshold value, the current frame is selected as an audio highlight; and if the audio zero-crossing rate is not greater than the audio threshold value, the current frame is not selected as the audio highlight.

38. The method of claim 22, wherein the step of deciding the highlights of the media stream according to the video highlights and the audio highlights follows a sequence that first decides the video highlights, and then determines the audio highlights, and processes the video highlights according to the audio highlights to determine the highlights of the media stream.

39. The method of claim 22, wherein the step of deciding the highlights of the media stream according to the video highlights and the audio highlights follows a sequence that first decides the audio highlights, and then decides the video highlights, and processes the audio highlights according to the video highlights to determine the highlights of the media stream.

40. The method of claim 22, where the highlights of the media stream are determined by referencing the video and audio highlights at the same time.

41. The method of claim 22, wherein the audio and video parameters are set separately for different preset circumstances.

42. The method of claim 22, wherein the step of deciding highlights of the media stream further comprises:
gathering a plurality of shots front or behind of the highlights to construct a complete highlight scene.

43. An apparatus for detecting highlights of a media stream, the apparatus comprising:
a video processing module for determining a video threshold value by referring to motion vectors in the media stream, wherein the video processing module comprises:
a motion-vector calculator for calculating a sum of motion vectors in a frame of the media stream;
a histogram calculator for calculating a histogram difference between two neighboring frames;
a shot data processing unit, electrically connected to the shot change detector and the motion-vector calculator, for determining a first computation result according to a plurality of sums of motion vectors corresponding to a plurality of frames in a shot, and for calculating a second computation result according to histogram differences in the shot; and
a video threshold value determining unit, electrically connected to the shot data processing unit, for determining the video threshold value according to the first computation result, computing a histogram reference value according to a plurality of histogram differences of the media stream, and determining the video threshold value only according to the first computation result in the shot when the second computation result is less than the histogram reference value;
an audio processing module for determining at least one audio threshold value by referring to volume energy in the media stream;
a shot change detector, electrically connected to the video processing module and the audio processing module, for deciding a shot change to inform the video processing module and the audio processing module; and
a post processor, electrically connected to the video processing module and the audio processing module, for determining the video highlights according to video parameters and the video threshold value, and the audio highlights according to audio parameters and the audio threshold value, and then deciding the highlights of the media stream according to the video highlights and the audio highlights;
wherein when a video parameter corresponding to a first frame is greater than the video threshold value, the post processor decides the first frame as a video highlight; and when an audio parameter corresponding to a second frame is greater than the audio threshold value, the post processor decides the second frame as an audio highlight.

44. An apparatus for detecting highlights of a media stream, the apparatus comprising:
a video processing module for determining a video threshold value by referring to motion vectors in the media stream;
an audio processing module for determining at least one audio threshold value by referring to volume energy in the media stream, wherein the audio processing module comprises:
a zero-crossing rate calculator for detecting an audio zero-crossing rate in a frame;
a shot data processing unit, electrically connected to the shot change detector and the zero-crossing rate calculator, for determining a computation result according to calculating audio zero-crossing rates of frames in a shot; and
an audio threshold value determining unit, electrically connected to the shot data processing unit, for determining the audio threshold value according to the computation result;
a shot change detector, electrically connected to the video processing module and the audio processing module, for deciding a shot change to inform the video processing module and the audio processing module; and
a post processor, electrically connected to the video processing module and the audio processing module, for determining the video highlights according to video parameters and the video threshold value, and the audio highlights according to audio parameters and the audio threshold value, and then deciding the highlights of the media stream according to the video highlights and the audio highlights;
wherein when a video parameter corresponding to a first frame is greater than the video threshold value, the post processor decides the first frame as a video highlight; and when an audio parameter corresponding to a second frame is greater than the audio threshold value, the post processor decides the second frame as an audio highlight.

45. An apparatus for detecting highlights of a media stream, the apparatus comprising:
a video processing module for determining a video threshold value by referring to motion vectors in the media stream;
an audio processing module for determining at least one audio threshold value by referring to volume energy in the media stream;
a shot change detector, electrically connected to the video processing module and the audio processing module, for deciding a shot change to inform the video processing module and the audio processing module; and
a post processor, electrically connected to the video processing module and the audio processing module, for determining the video highlights according to video parameters and the video threshold value, and the audio highlights according to audio parameters and the audio threshold value, and then deciding the highlights of the media stream according to the video highlights and the audio highlights; and, an audio parameter being an audio zero-crossing rate, the post processor comparing an audio zero-crossing rate of a current frame with the audio threshold value, deciding the current frame as an audio highlight if the audio zero-crossing rate is greater than the audio threshold value, and not deciding the current frame as the audio highlight if the audio zero-crossing rate is not greater than the audio threshold value;
wherein when a video parameter corresponding to a first frame is greater than the video threshold value, the post processor decides the first frame as a video highlight; and when an audio parameter corresponding to a second frame is greater than the audio threshold value, the post processor decides the second frame as an audio highlight.

46. A method for detecting highlights of a media stream, the method comprising:
determining a video threshold value by referring to motion vectors in the media stream, and the step of determining the video threshold value comprises:
calculating a sum of motion vectors in a frame of the media stream;
determining a first computation result according to a plurality of sums of motion vectors corresponding to a plurality of frames in a shot;
calculating a histogram difference between two neighboring frames;
determining a second computation result according to histogram differences in the shot; and
computing a histogram reference value according to a plurality of histogram differences of the media stream; and
determining the video threshold value only according to the first computation result in the shot when the second computation result is less than the histogram reference value;
determining at least one audio threshold value by referring to volume energy in the media stream;
deciding a shot change to divide the media stream into several shots; and
determining video highlights according to video parameters and the video threshold value, and determining audio highlights according to audio parameters and the audio threshold value, and then deciding the highlights of the media stream according to the video highlights and the audio highlights;
deciding a first frame as a video highlight when a video parameter corresponding to the first frame is greater than the video threshold value; and
deciding a second frame as an audio highlight when an audio parameter corresponding to the second frame is greater than the audio threshold value.

47. A method for detecting highlights of a media stream, the method comprising:
determining a video threshold value by referring to motion vectors in the media stream;
determining at least one audio threshold value by referring to volume energy in the media stream, and the step of determining at least one audio threshold value comprises:
detecting an audio zero-crossing rate in a frame;
determining a first computation result according to calculating audio zero-crossing rates of frames in a shot; and
determining the audio threshold value according to the first computation result;
deciding a shot change to divide the media stream into several shots; and
determining video highlights according to video parameters and the video threshold value, and determining audio highlights according to audio parameters and the audio threshold value, and then deciding the highlights of the media stream according to the video highlights and the audio highlights;
deciding a first frame as a video highlight when a video parameter corresponding to the first frame is greater than the video threshold value; and
deciding a second frame as an audio highlight when an audio parameter corresponding to the second frame is greater than the audio threshold value.

48. A method for detecting highlights of a media stream, the method comprising:
determining a video threshold value by referring to motion vectors in the media stream;
determining at least one audio threshold value by referring to volume energy in the media stream;
deciding a shot change to divide the media stream into several shots; and
determining video highlights according to video parameters and the video threshold value, and determining audio highlights according to audio parameters and the audio threshold value, and then deciding the highlights of the media stream according to the video highlights and the audio highlights;
deciding a first frame as a video highlight when a video parameter corresponding to the first frame is greater than the video threshold value;
deciding a second frame as an audio highlight when an audio parameter corresponding to the second frame is greater than the audio threshold value; and
when an audio parameter is an audio zero-crossing rate, comparing the audio zero-crossing rate of a current frame with the audio threshold value; if the audio zero-crossing rate is greater than the audio threshold value, the current frame is selected as an audio highlight; and if the audio zero-crossing rate is not greater than the audio threshold value, the current frame is not selected as the audio highlight.

* * * * *